United States Patent Office 2,762,397
Patented Sept. 11, 1956

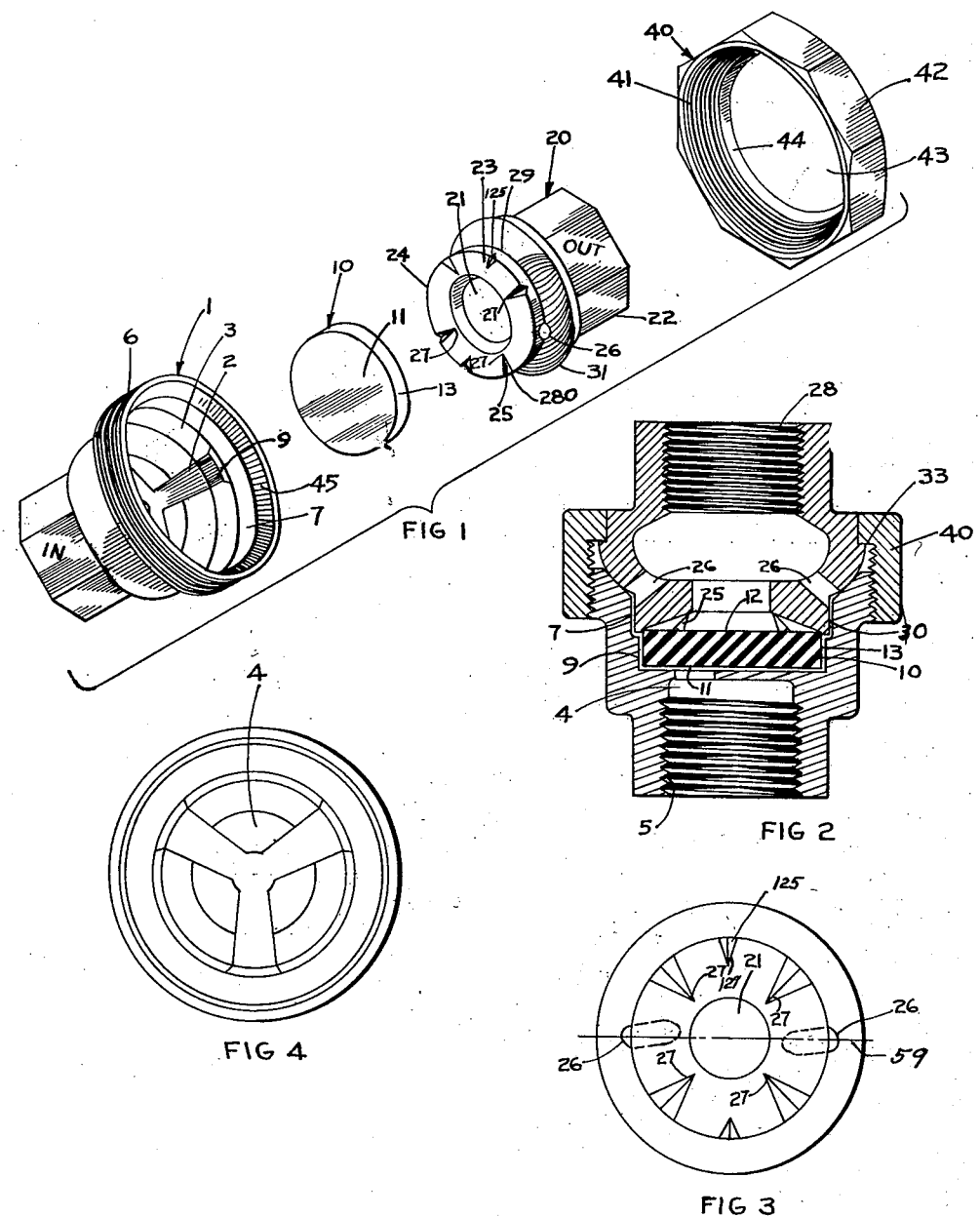

2,762,397
FLOW CONTROL DEVICE

Wesley G. Miller, Erie, Pa., assignor to Hays Manufacturing Company, Erie, Pa., a corporation of Pennsylvania Application June 24, 1952, Serial No. 295,319

12 Claims. (Cl. 138—43)

This invention relates generally to flow control devices for controlling the flow of fluid through a pipe line wherein the pressure and temperature of the fluid in the pipe line vary. This application sets forth an improvement of the flow control device set forth in my Patent No. 2,554,790.

In previous flow control devices using a resilient diaphragm to restrict the flow of fluid through the device, when the pressure was raised to a high value such as about one hundred fifty pounds per square inch, the flow of fluid through the device was substantially constant; then as the pressure was decreased because the resilient diaphragm was deformed at a high pressure on the upstream side, it did not regain its original shape and the flow of fluid through the device dropped off substantially.

In the present device, the holes which are bored to bypass the flow of fluid past the resilient diaphragm pick up the turbulence in the fluid below the diaphragm and thereby prevent the volume flow of fluid through the device from dropping off after a high pressure has been maintained for some time. The flow of fluid through the bypass holes appears to relieve the pressure on the diaphragm and thereby prevents it from the extreme distortion and flow which would ordinarily take place in it, which condition seriously interrupts the constant flow of fluid through the device.

It is, accordingly, an object of my invention to overcome the above and other defects in flow control devices and it is more particularly an object of my invention to provide a flow control device which is simple in construction, economical in cost, efficient in operation, and economical in manufacture.

Another object of my invention is to provide a flow control device for use in a fluid line which flow control device controls the quantity of fluid passing therethrough at substantially constant volume flow, regardless of the variations in pressure of the fluid.

Another object of my invention is to provide a fluid control device for use in a fluid line which permits maximum flow of fluid while controlling the quantity of fluid passing from the line.

Another object of my invention is to provide a fluid control device for use in a fluid line which permits control of the flow from the fluid line at a predetermined, extremely low, initial pressure.

Another object of my invention is to provide a flow control device which has a maximum useful life and which will control the flow of fluid over a wide range of pressure changes.

Another object of my invention is to provide a fluid flow control device wherein a turbulence is set up on the downstream side of the actuating member whereby the flow of fluid through the device is increased.

Another object of my invention is to provide a fluid flow control device wherein a resilient disk is used to control the flow of fluid through the device and a bypass is provided to bypass the resilient diaphragm and equalize the pressure on either side thereof.

Other objects of my invention will become evident from the following detailed description, taken in conjunction with the accompanying drawings, in which Fig. 1 is a consolidated view of the invention showing the various parts of the invention in perspective;

Fig. 2 is a transverse sectional view of the invention;

Fig. 3 is a top view of one of the parts of the device according to the invention; and Fig. 4 is a bottom view of another part of the invention.

Referring now more particularly to the drawings, Fig. 1 shows a consolidated view of the invention showing the cap or backing member 1 having a spider portion 2 and a cylindrical surface 3. The ribs 9 extend inwardly from the periphery of the cylindrical portion 3. The resilient disk shaped diaphragm member 10 is adapted to be disposed within the cylindrical surface 3 with its peripheral surface 13 in juxtaposition to ribs 9 and its surface 11 in juxtaposition to the spider member 2. The spider member 2 has radially extending legs which join each other at the center and engage the ribs 9 at their outer edge. An opening 4 extends through the cap; that is, through the cap between the legs of the spider 2, and the opening 4 terminates at the downstream end in the portion thereof bounded by the cylindrical surface 3, the upstream end of the opening 4 being defined by the threaded end 5. The ribs 9 which are attached to the cylindrical surface 3 and extend inwardly therefrom hold the resilient diaphragm in spaced relation to the cylindrical surface 3 and, therefore, provide a path for the flow of fluid between the peripheral edges of the diaphragm and the cylindrical surface 3. The members 1 and 20 make up a body member. The threaded portion defining the opening 4 in the cap may accommodate the threaded end of a pipe and the outside of the other end of the cap 1 is threaded at 6 to accommodate the internal threads 41 of the ring, union nut, or union cap member 40. The resilient disk or diaphragm member 10 is preferably made of a flexible resilient elastic material such as rubber although other suitable resilient materials may be used.

It will be noted from Fig. 1 that the resilient diaphragm member 10 is disk shaped having flat surfaces 11 and 12. An outlet member or sleeve and pressure plate 20 is provided with an opening 21 therethrough to accommodate the flow of fluid and it is provided with flattened peripheral surfaces 22 to accommodate a wrench or other suitable tool during the installation of the device in a pipe line.

The upstream surface of the pressure plate has a concave surface 23 with a peripheral edge 24 for the resilient member 10 to rest against during operation and grooves 25 are cut in the peripheral edges. Bores 26 are formed in the pressure plate from the outside of the cylindrical surface and extend inwardly and in a downstream direction and at an angle to the transverse center line 59 of the pressure plate. Liquid flowing through the bores 26 is directed in a downstream direction and into the outer portion or sides of the fluid stream flowing through the opening 21 in the pressure plate to create a turbulence in the fluid stream, thereby increasing the rate of flow. When the pressure plate is assembled in the cap, the upstream end of the pressure plate forms a partition in the body member with the opening 21 extending therethrough and connecting the opening 4 with the opening through the internally threaded end 28. It will be noted that the grooves 25 taper inwardly at 27; that is, they are cut deepest at the outer edge of surface 23 and decrease to zero depth or run out as they approach the inner edge. The outside end of the grooves are V-shaped at 280. The union nut 40 is provided with internal threads 41 to engage the external threads 6 on the cap member 1 and the outside of the union nut 40 is provided with flattened surfaces 42 to accommodate a wrench or other suitable tool for use during assembly of the device. The pressure plate 20 has internal threads 28 which are adapted to be connected to a pipe line.

When the flow control device is connected in a pipe line by connecting the threaded end 5 to the upstream side of the pipe and the threaded end 28 to the downstream end, the pressure of the fluid in the pipe will react on the upstream side of the resilient member 10 to deform it in a concave manner in the downstream direction into the concave member at 23 in proportion to the fluid pressure. The outer portion of the surface 12 of the resilient member 10 is supported on the peripheral edge 24 of the outlet member 20 since the outer peripheral edges of the diaphragm 10 are supported on the peripheral edge 24, the periphery of the diaphragm will not be deformed substantially but the center portion of the surface 12 of the resilient member 10 will be deflected toward the concave surface 23 of the outlet member 20. This will tend to restrict the flow of fluid through the grooves 25 so that an increase in pressure of the fluid in the pipe will tend to decrease the effective size of the opening through the grooves 25. When the diaphragm is completely depressed into contiguous relation with the surface 23, the openings through the grooves 25 will be completely cut off. Then as the pressure is slightly reduced, the diaphragm 10 will lift itself up out of engagement with the inner portion of the concave surface and fluid will be allowed to flow through the grooves 25 but the maximum cross sectional area of flow will still be restricted. Then as pressure continues to be reduced, the diaphragm will lift itself out of engagement with the concave surface and the maximum depth of the grooves will be affected.

The grooves 125 taper inwardly at 127 similar to grooves 25; however, grooves 125 are not cut as deep as grooves 25. By making grooves 125 of different length from grooves 25, a much better flow regulation is accomplished.

In assembling the parts shown in Fig. 1 to their respective positions shown in Fig. 2, one side edge 11 of the resilient disk 10 is placed against the spider member 2 of the cap 1 and the peripheral edge 13 is placed adjacent the cylindrical portion 3 of the cap 1 in juxtaposition to the ribs 9. The outlet member 20 is then assembled by inserting the cylindrical member 29 into the bore 7 of the outlet member and disposing the peripheral edge 24 adjacent the edge 12 of the resilient member 10.

The edge 30 of the cylindrical member 29 is spaced from the edge 7 of cap member 1, thereby providing a path for the flow of fluid from orifices 26. The convex spherically shaped edge 31 of outlet member 20 engages the edges 45 of cap 1 to provide a seal against leakage of fluid.

The flattened end 22 of the outlet member 20 is then put through the opening 43 and threads 41 are engaged with threads 6. Edge 44 of the union nut engages edge 33 of the outlet member 20 to force edges 45 and 31 into sealing engagement. In normal operation, the member 1 will be on the upstream side and the member 2 on the downstream side.

Various changes may be made in the specific embodiment of my invention without departing from the spirit thereof or from the scope of the appended claims.

What I claim is:

1. A flow control device comprising a cap member having an opening therethrough, a pressure plate member, said pressure plate member terminating at one end in a cylindrical portion, an opening extending through said pressure plate member through said cylindrical portion and communicating with said opening through said cap member, said cylindrical portion extending into said opening in said cap member, the end surface of said cylindrical portion around said opening therethrough being concave and having radially extending grooves therein terminating at the outer peripheral edges of said cylindrical portion, said grooves being deepest at the outer ends thereof, and a resilient relatively thick disk like member having its peripheral edge resting on said concave surface and spaced from said opening through said pressure plate member, said disk member being adapted to be deformed progressively toward contiguous relation with said concave surface as the pressure of fluid flowing through said cap member and said pressure plate member increases to restrict the effective size of fluid flow path through said grooves.

2. The device set forth in claim 1 wherein said resilient member is smaller than the portion of said opening in said cap member in which said resilient member is disposed and apertures are bored through said cylindrical member from the outside thereof communicating with the opening therethrough and with said opening through said cap whereby fluid bypasses the flow through said slots.

3. The device recited in claim 2 wherein the apertures extend at an angle to a transverse center line of said opening through said pressure plate.

4. The device recited in claim 3 wherein the apertures extend at an angle to a transverse center line of said opening through said pressure plate and away from the cap member.

5. The device recited in claim 1 wherein said opening terminates at the downstream end in a portion bounded by a cylindrical surface, a spider member is joined to the said cylindrical surface of said opening through said cap and extends inwardly from said cylindrical surface, said spider member engaging one surface of said resilient member and limiting the movement of said resilient member in a direction away from said concave surface when fluid flow through said device is stopped.

6. The device recited in claim 1 wherein said opening in said cap member terminates at the downstream end in a cylindrical surface and is provided inside the material bounding said opening in said cap member adjacent said cylindrical surface with spaced ribs attached to said cylindrical surface, said spaced ribs extending inwardly from said cylindrical surface and engage said resilient member, spacing it inward from said cylindrical surface.

7. A flow control device comprising a backing member having an opening therethrough, a pressure plate with an opening therethrough and having a cylindrical member extending into said backing member opening, said pressure plate sealingly engaging a portion of said backing member, a concave surface on said cylindrical member concentric with said opening through said pressure plate, radially extending grooves in said surface, said grooves being deepest at the ends thereof remote from said opening in said pressure plate, and a resilient member resting on said surface remote from said opening and overlapping said grooves, said resilient member adapted to deflect in conformance with said concave surface in proportion to fluid pressure in said device, thereby restricting the flow of fluid through said grooves.

8. A flow control device comprising a cap member having an opening therethrough, a pressure plate member, said pressure plate member having an opening extending therethrough in general alignment with the opening in said cap member, said pressure plate member having a generally cylindrical portion on one end thereof concentric with said opening in the cap and extending into said opening in said cap, one end surface of said cylindrical portion being concave and terminating in an outer edge, said outer edge being spaced from the inside of said opening through said cap member, generally radially extending slots cut in said concave end surface and extending outward to the cylindrical surface of said cylindrical member, and a resilient disk like member resting on the peripheral edge of said concave surface and adapted to be deformed to move nearer into engagement with said concave surface as the fluid pressure in said device increases in a direction from said cap into said device to restrict the effective size of the fluid path through said slots.

9. A flow control device comprising a cap member having an opening therethrough, a spider member having legs extending across said opening, ribs extending inwardly from the material bounding said opening adjacent said spider member legs, a pressure plate member having an opening therethrough extending into said cap member opening, a disk member made of resilient material and adapted to engage said spider member legs and to be held in spaced relation to the portion of said cap member around said opening by said rib members, the material bounding said opening through said cap member being concave adjacent one end, a pressure plate adapted to extend into said cap member having a convex surface adapted to sealingly engage said concave surface on said cap member, said pressure plate member extending into said opening in said cap member and terminating in an end having a concave surface adapted to support said resilient disk, a central opening through said pressure plate member adapted to communicate with said opening in said cap member, said end surface of said pressure plate having radial slots therein deepest at the peripheral edge of said end surface, said resilient member being adapted to be deformed into said slots in said pressure plate by fluid flowing through said cap member through said slots into said pressure plate opening, means to hold said pressure plate in sealing engagement with said cap member, and means to attach an inlet conduit to said cap member and an outlet conduit to said pressure plate member.

10. The flow control recited in claim 9 wherein holes are bored in said pressure plate member in the portion thereof inside said cap member, said holes extending from the outside surface thereof to the inside and inclined inwardly away from said end concave surface.

11. The flow control recited in claim 10 wherein said holes bored in said pressure plate member extend at an angle to a transverse center line of said opening through said pressure plate member whereby water flowing through said bores is directed into the edges of a stream of fluid flowing through said pressure plate member.

12. A flow control device comprising a hollow body having an inlet and an outlet with a partition therein having a reduced size opening therethrough, the upstream side of said partition being concave, said reduced size opening being disposed substantially at the center of said concave side, means to connect said flow control in a fluid line, radial grooves in said concave side extending from said reduced size opening outwardly, said grooves being deepest at the ends thereof most remote from said opening, said grooves in said end comprising fluid flow paths, and a resilient disk having substantial thickness being generally coextensive with said end and resting on said end around the outside edges of said concave side, said resilient disk being adapted to be deflected by the pressure of fluid toward said concave side whereby the size of fluid stream through said grooves is reduced as fluid pressure increases.

References Cited in the file of this patent

UNITED STATES PATENTS

| | | |
|---|---|---|
| 1,319,782 | Maul | Oct. 28, 1919 |
| 2,454,929 | Kempton | Nov. 30, 1948 |
| 2,489,542 | Rosenblum | Nov. 29, 1949 |
| 2,554,790 | Miller | May 29, 1951 |